United States Patent [19]
Moffatt et al.

[11] Patent Number: 5,207,824
[45] Date of Patent: May 4, 1993

[54] FORMULATION FOR CONTROL OF PAPER COCKLE IN THERMAL INK-JET PRINTING

[75] Inventors: John R. Moffatt; Hiang P. Lauw, both of Corvallis, Oreg.

[73] Assignee: Hewlett-Packard Company, Palo Alto, Calif.

[21] Appl. No.: 872,204

[22] Filed: Apr. 16, 1992

[51] Int. Cl.⁵ .............................................. C09D 11/02
[52] U.S. Cl. ................................. 106/22 R; 106/20 R
[58] Field of Search ............... 106/20, 22, 20 R, 20 D, 106/22 R

[56] References Cited

U.S. PATENT DOCUMENTS

| | | | |
|---|---|---|---|
| 3,776,742 | 12/1973 | Sanders | 106/22 |
| 4,176,361 | 11/1979 | Kawada et al. | 106/20 |
| 4,285,727 | 8/1981 | Uehara et al. | 106/22 |
| 4,381,946 | 5/1983 | Uehara et al. | 106/22 |
| 4,685,968 | 8/1987 | Palmer | 106/22 |
| 4,786,327 | 11/1988 | Wenzel et al. | 106/20 |
| 5,059,246 | 10/1991 | Yamamoto et al. | 106/20 |
| 5,069,718 | 12/1991 | Kappele | 106/20 |
| 5,098,476 | 3/1992 | Baker | 106/22 |
| 5,108,501 | 4/1992 | Moffatt | 106/22 |

*Primary Examiner*—Mark L. Bell
*Assistant Examiner*—Helene Klemanski

[57] ABSTRACT

Paper cockle, which results from printing inks having a high water content, is reduced in thermal ink-jet inks by adding about 15 to 50 wt % of an anti-cockle agent comprising a compound selected from the group consisting of hexaethylene glycol and an organic compound having from four to eight carbon atoms and two or three OH groups. The inks contain the commonly-employed components of water, dye, and a low vapor pressure solvent, in addition to the anti-cockle agents, and may include additional components to control specific properties, such as color bleed, threading, kogation, and the like.

18 Claims, 1 Drawing Sheet

FORMULATION FOR CONTROL OF PAPER COCKLE IN THERMAL INK-JET PRINTING

TECHNICAL FIELD

The present invention relates generally to thermal ink-jet printing, and, more particularly, to the control of paper cockle which can occur during printing.

BACKGROUND ART

Thermal ink-jet printers offer a low cost, high quality, and comparatively noise-free option to other types of printers commonly used with computers. Such printers employ a resistor element in a chamber provided with an egress for ink to enter from a plenum. The plenum is connected to a reservoir for storing the ink. A plurality of such resistor elements are arranged in a particular pattern, called a primitive, in a printhead. Each resistor element is associated with a nozzle in a nozzle plate, through which ink is expelled toward a print medium. The entire assembly of printhead and reservoir comprise an ink-jet pen.

In operation, each resistor element is connected via a conductive trace to a microprocessor, where current-carrying signals cause one or more selected elements to heat up. The heating creates a bubble of ink in the chamber, which is expelled through the nozzle toward the print medium. In this way, firing of a plurality of such resistor elements in a particular order in a given primitive forms alphanumeric characters, performs area-fill, and provides other print capabilities on the medium.

Many inks that are described for use in ink-jet printing are usually associated with non-thermal ink-jet printing. An example of such non-thermal ink-jet printing is piezoelectric ink-jet printing, which employs a piezoelectric element to expel droplets of ink to the medium. Inks suitably employed in such non-thermal applications often cannot be used in thermal ink-jet printing, due to the effect of heating on the ink composition.

Paper cockle remains a problem with certain thermal ink-jet inks printed on paper passing over either a heated or non-heated platen. Specifically, during printing a full page image (0.25 inch margin on three or four sides of an 8½×11 page), with certain inks, the surface of the paper puckers or crinkles, generating a washboard-like surface texture. This phenomenon, called "cockle", occurs during printing, and can be severe enough to interfere with the printing process. This is to be contrasted with paper curl, in which the paper turns into a scroll-like tube. The onset of curling sometimes takes days to develop.

A need exists for a reformulation of certain thermal ink-jet inks to avoid paper cockle.

DISCLOSURE OF INVENTION

In accordance with the invention, thermal ink-jet inks provided with about 15 to 50 wt % of an organic compound comprising hexaethylene glycol or having four to eight carbon atoms and two or three OH groups evidence reduced paper cockle. The minimum concentration of the organic compound depends on the number of carbon atoms; the higher the number of carbon atoms, the closer to 15 wt % is the minimum concentration that may be employed.

The inks contain the usual components of water, dye, and a low vapor pressure solvent, which contains the organic compound, or anti-cockle agent. The inks may also include other components to control color bleed, threading, kogation, and the like.

It will be appreciated that the printing herein is done in the absence of a heated platen. Heated platens tend to create more curl in printed paper than unheated platens.

BEST MODES FOR CARRYING OUT THE INVENTION

Figure 1:
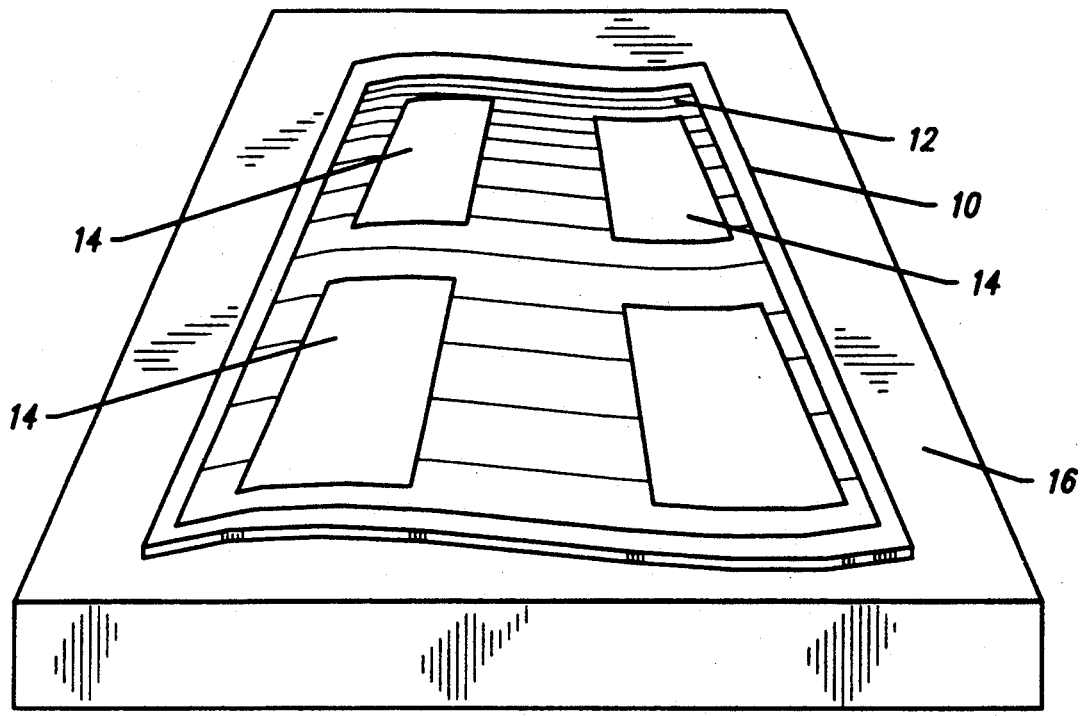
FIG. 1 is a perspective view, showing paper which evidences cockle after printing a given pattern.

An organic compound containing two or three OH groups is added to a conventional thermal ink-jet ink formulation to reduce paper cockle. Such ink formulations comprise about 0.5 to 20 wt % of a low vapor pressure solvent, about 0.5 to 5 wt % water-soluble dye, and the balance water. By low vapor pressure is meant that the solvent has a vapor pressure lower than that of water.

Low vapor pressure solvents include, but are not restricted to, glycols such as ethylene glycol, diethylene glycol, triethylene glycol, tetraethylene glycol, propylene glycol, polyethylene glycol, polypropylene glycol, and derivatives thereof; glycol esters such as propylene glycol laurate; mono and di glycol ethers such as the CELLOSOLVES (CELLOSOLVE is a trademark of Dow Chemical Corporation), including ethylene glycol monobutyl ether, diethylene glycol ethers such as the CARBITOLS (CARBITOL is a trademark of Union Carbide Corporation), diethylene glycol mono ethyl, butyl, hexyl ethers, propylene glycol ether, dipropylene glycol ether, and triethylene glycol ether; long chain alcohols such as butyl alcohol, pentyl alcohol, and homologous alcohols; and other solvents such as sulfolane, esters, ketones, lactones such as γ-butyrolactone, lactams such as N-pyrrolidone, 2-pyrrolidone, and N-(2-hydroxyethyl) pyrrolidone, and glycerols and their derivatives.

The dye component may comprise one or more of the common water-soluble dyes employed in thermal ink-jet printing.

Other components, such as high molecular weight colloids, surfactants, anti-kogating agents, and the like to control specific properties, such as color bleed, threading, kogation, etc. may also be included in the ink formulation. Such other components, which are described in other patents and patent applications owned by the same assignee as the present application, do not form a part of this application. Such other patent applications include Ser. No. 07/737,101, filed Jul. 29, 1991 now U.S. Pat. No. 5,133,803 (high molecular weight colloids), Ser. No. 07/686,731, filed Apr. 17, 1991 now U.S. Pat. No. 5,116,409 (surfactants), Ser. No. 07/751,369, filed Aug. 28, 1991 now U.S. Pat. No. 5,106,416 (surfactants), and Ser. No. 07/724,649, filed Jul. 2, 1991 now U.S. Pat. No. 5,108,501 (anti-kogating agents). Such other patents include U.S. Pat. No. 5,061,316, issued Oct. 29, 1991 (anti-kogating agents).

The present invention preferably employs as the high molecular weight colloid "sodium" alginate having a molecular weight of about 12,000 to 80,000 and a typical degree of polymerization range of about 60 to 400.

This range provides the desired bleed control of the inks. "Sodium" alginates typically comprise 5.5% sodium, 2% calcium, and 9.5% potassium as the principal counterions, along with trace amounts of other mono- and di-valent cations.

The alginates most preferably employed in the practice of the invention are characterized by relatively low viscosity: a 1% solution in water yields a viscosity of 60 centipoise (cp). The amount of alginate, if used, ranges from about 0.05 to 0.5 wt %. Such material is commercially available from Aldrich Chemical Company (Milwaukee, Wis.).

A preferred surfactant is an amine oxide, such as N,N-dimethyl-N-dodecyl amine oxide (NDAO):

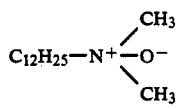

Also, in place of the $C_{12}H_{25}$-moiety, any R moiety may be used. The following moieties, their name, and abbreviation, are useful in the practice of the invention:
N,N-dimethyl-N-tetradecyl amine oxide (NTAO);
N,N-dimethyl-N-hexadecyl amine oxide (NHAO);
N,N-dimethyl-N-octadecyl amine oxide (NOAO);
N,N-dimethyl-N-(Z-9-octadecenyl)-N-amine oxide (OOAO).

The surfactant is present in a concentration at least sufficient to form micelles in the ink, as discussed, for example, in applications Ser. No. 07/686,731 and Ser. No. 07/751,369.

The inks also include one or more biocides, fungicides, and/or slimicides, as is commonly practiced in the art.

All concentrations herein are in weight percent, unless otherwise indicated. The purity of all components is that employed in normal commercial practice for thermal ink-jet inks.

The anti-cockle agent of the invention comprises an organic compound having from four to eight carbon atoms and two or three OH groups. The amount of anti-cockle agent broadly ranges from about 15 to 50 wt % of the total ink composition. Alternatively, the anti-cockle agent may comprise hexaethylene glycol. However, the organic compounds having the greater number of carbon atoms are associated with a lower minimum concentration. That is, those compounds having a lesser number of carbon atoms require a higher minimum concentration.

The anti-cockle agent must have at least four carbon atoms to be effective. However, organic compounds having more than eight carbon atoms and two or three OH groups are solids, and thus may not be useful in ink compositions. Certain solid compounds, such as hexaethylene glycol, do not pose a problem as an anti-cockle agent. The key is whether a solid compound will come back out of solution once jetted onto the print medium, due to the energy released in making the phase change. Simple experimentation will suffice to determine which compounds in solid form or in waxy form, such as hexaethylene glycol, will come back out of solution.

At least about 15 wt % of the anti-cockle agent is required in order to obtain the requisite reduction in paper cockle, at least of the higher number of carbon atoms, as indicated above. More than about 50 wt % results in problems in printing on other print media, such as transparencies, and in an unacceptable increase in dry time. A compound may serve as both low vapor pressure solvent and as anti-cockle agent. In such a case, it is required that both the amount of about 0.5 to 20 wt % (for the low vapor pressure solvent) and about 15 to 50 wt % (for the anti-cockle agent) be satisfied.

Examples of anti-cockle agents useful in the practice of the invention include, but are not limited to, pentanediol (minimum about 25 wt %), such as 1,5-pentanediol and 2,4-pentanediol, 1,4-butanediol (minimum about 30 wt %), 1,3,5-pentanetriol, hexanediol (minimum about 20 wt %), and hexanetriol (minimum about 20 wt %). In the case of hexaethylene glycol, the minimum is about 30 wt %.

Further, non-toxic sulfur-containing alkane glycols having four to eight carbon atom and two or three —OH groups, such as thiodiglycol, may also be employed in the practice of the invention. As employed herein, the term "anti-cockle agent" is intended to include those glycol ethers having an oxygen atom or a sulfur atom in the backbone of the molecule, as well as the alkane diols and triols described above.

INDUSTRIAL APPLICABILITY

The ink formulations are expected to find use in thermal ink-jet printing applications to reduce cockle, particularly in high print density printing.

EXAMPLES

Example 1

An ink set was prepared in which each ink had the following formulation (% by weight):
8% 1,5-pentanediol,
1% N,N-dimethyl-N-(Z-9-octadecenyl)-N-amine oxide,
0.5% sodium cholate,
0.25% sodium alginate (low viscosity),
dye,
and the balance water.

The dyes (and dye loads) were (a) either 1.8 wt % sodium-Acid Blue 9 or 1.8 wt % sodium-Direct Blue 199 (cyan inks), (b) 0.5 wt % tetramethylammonium-substituted Acid Yellow 23 plus 0.5 wt % tetramethylammonium-substituted Direct Yellow 86 (yellow inks), and (c) 1.3 wt % sodium-Acid Red 52 (red inks).

Gilbert bond paper (25% cotton fiber) was printed on, full-page image. In particular, the paper was printed with the three inks as composite black, in order to supersaturate the paper with the vehicles and the dyes, to promote the most extreme conditions to induce paper cockle. In addition, squares of yellow ink were printed at the same time the composite black background was printed. FIG. 1 shows the paper medium 10, on which the black background 12 was printed, together with yellow squares 14. The paper 10 is shown supported on a flat surface 16. The printed paper evidenced cockle, as is apparent in FIG. 1.

Example 2

An ink set was prepared in which each ink had the following formulation (% by weight):
25% 1,5-pentanediol,
1% N,N-dimethyl-N-(Z-9-octadecenyl)-N-amine oxide,
0.5% sodium cholate,
0.25% sodium alginate (low viscosity),
dye,
and the balance water.

The dyes (and dye loads) were (a) 1.8 wt % sodium-Acid Blue 9, (b) 0.5 wt % tetramethylammonium-substituted Acid Yellow 23 plus 0.5 wt % tetramethylammonium-substituted Direct Yellow 86, and (c) 1.3 wt % sodium-Acid Red 52.

Figure 2:
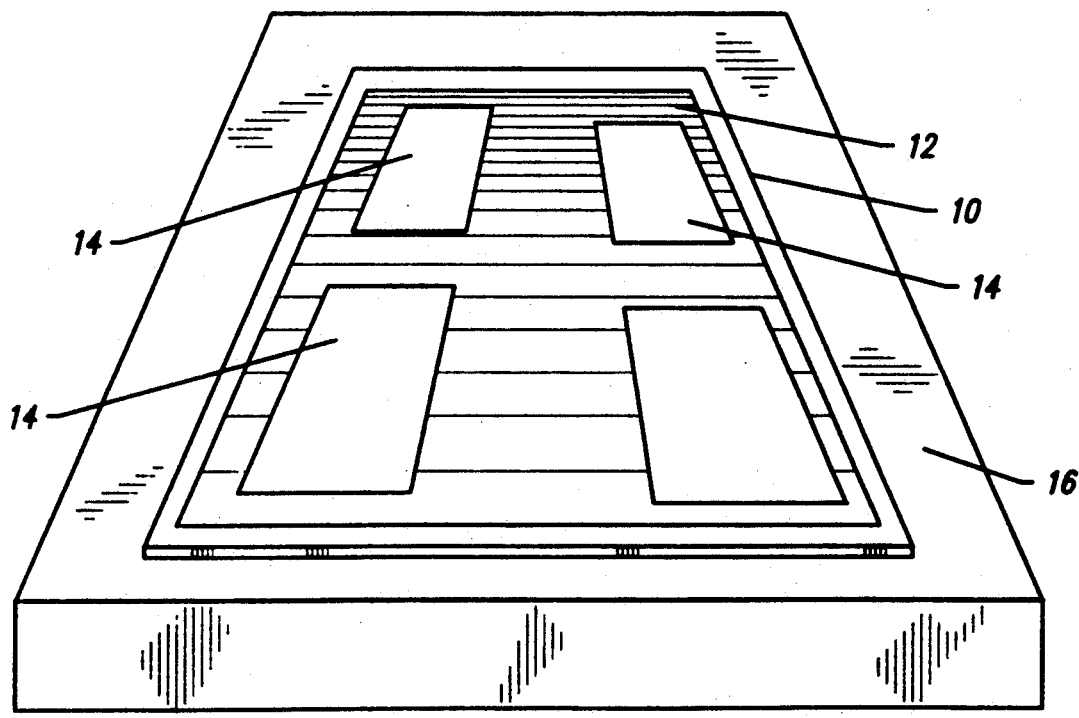
FIG. 2 is a perspective view similar to that of FIG. 1, except that in printing the same pattern, an ink of the invention was used, which results in greatly reduced cockle.

Upon printing on paper with the foregoing ink, as in Example 1, the paper evidenced substantially no cockle, as is apparent in FIG. 2.

Thus, thermal ink-jet inks have been disclosed which evidence reduced paper cockle even upon full-page image printing. Various changes and modifications of an obvious nature may be made without departing from the spirit of the invention, and all such changes and modifications are considered to fall within the scope of the invention as defined by the appended claims.

What is claimed is:

1. An improved thermal ink-jet ink evidencing reduced medium cockle consisting essentially of:
   (a) about 0.5 to 20 wt % of at least one low vapor pressure solvent;
   (b) about 0.5 to 5 wt % of at least one water-soluble dye;
   (c) about 15 to 50 wt % of an anti-cockle agent, based on the total ink composition, said anti-cockle agent comprising a compound selected from the group consisting of hexaethylene glycol and an organic compound having from four to eight carbon atoms and from two to three OH groups; and
   (d) water.

2. The thermal ink-jet ink of claim 1, wherein said anti-cockle agent consists essentially of a member selected from the group consisting of alkane diols, alkane triols, glycols, and non-toxic sulfur-containing glycols.

3. The thermal ink-jet ink of claim 2, wherein said alkane diols are selected from the group consisting of 1,5-pentanediol, 2,4-pentanediol, 1,4-butanediol, and hexanediol, said alkane triols are selected from the group consisting of 1,3,5-pentanetriol and hexanetriol, and said sulfur-containing glycol is thiodiglycol.

4. The thermal ink-jet ink of claim 1, wherein said low vapor pressure solvent is selected from the group consisting of glycols, glycol esters, glycol ethers, long chain alcohols, sulfolane, esters, ketones, lactones, lactams, and glycerols and their derivatives.

5. The thermal ink-jet ink composition of claim 4, wherein said glycol is selected from the group consisting of ethylene glycol, diethylene glycol, triethylene glycol, tetraethylene glycol, propylene glycol, polyethylene glycol, polypropylene glycol, and derivatives thereof; said glycol ester is propylene glycol laurate; said glycol ethers are selected from the group consisting of ethylene glycol mono-butyl ether, diethylene glycol mono ethyl, butyl, and hexyl ethers, propylene glycol ether, dipropylene glycol ether, and triethylene glycol ether; said long chain alcohol is selected from the group consisting of butyl alcohol, pentyl alcohol, and homologous alcohols; said lactone is γ-butyrolactone; said lactam is selected from the group consisting of N-pyrrolidone, 2-pyrrolidone, and N-(2-hydroxyethyl) pyrrolidone.

6. The thermal ink-jet ink of claim 1 further including at least one of the following components: (a) an amine oxide as surfactant, present in at least an amount sufficient to form micelles, and (b) about 0.05 to 0.5 wt % of an alginate to control color bleed.

7. The thermal ink-jet ink of claim 6, wherein said amine oxide is about 1 wt % of N,N-dimethyl-N-(Z-9-octadecenyl)-N-amine oxide and wherein said alginate is about 0.25 wt % of sodium alginate.

8. A method of reducing medium cockle during thermal ink-jet printing onto said medium, comprising employing a thermal ink-jet ink consisting essentially of
   (a) about 0.5 to 20 wt % of at least one low vapor pressure solvent;
   (b) about 0.5 to 5 wt % of at least one dye;
   (c) about 15 to 50 wt % of an anti-cockle agent, based on the total ink composition, said anti-cockle agent comprising a compound selected from the group consisting of hexaethylene glycol and an organic compound having from four to eight carbon atoms and from two to three OH groups; and
   (d) water.

9. The method of claim 8, wherein said anti-cockle agent consists essentially of a member selected from the group consisting of alkane diols, alkane triols, glycols, and non-toxic sulfur-containing glycols.

10. The method of claim 9, wherein said alkane diols are selected from the group consisting of 1,5-pentanediol, 2,4-pentanediol, 1,4-butanediol, and hexanediol, said alkane triols are selected from the group consisting of 1,3,5-pentanetriol and hexanetriol, and said sulfur-containing glycol is thiodiglycol.

11. The method of claim 8, wherein said low vapor pressure solvent is selected from the group consisting of glycols, glycol esters, glycol ethers, long chain alcohols, sulfolane, esters, ketones, lactones, lactams, and glycerols and their derivatives.

12. The method of claim 11, wherein said glycol is selected from the group consisting of ethylene glycol, diethylene glycol, triethylene glycol, tetraethylene glycol, propylene glycol, polyethylene glycol, polypropylene glycol, thiodiglycol, and derivatives thereof; said glycol ester is propylene glycol laurate; said glycol ethers are selected from the group consisting of ethylene glycol monobutyl ether, diethylene glycol mono ethyl, butyl, and hexyl ethers, propylene glycol ether, dipropylene glycol ether, and triethylene glycol ether; said long chain alcohol is selected from the group consisting of butyl alcohol, pentyl alcohol, and homologous alcohols; said lactone is γ-butyrolactone; said lactam is selected from the group consisting of N-pyrrolidone, 2-pyrrolidone, and N-(2-hydroxyethyl) pyrrolidone.

13. The method of claim 8, wherein said thermal ink-jet ink further includes at least one of the following components: (a) an amine oxide as surfactant, present in at least an amount sufficient to form micelles, and (b) about 0.05 to 5 wt % of a alginate to control color bleed.

14. The method of claim 13, wherein said amine oxide is about 1 wt % of N,N-dimethyl-N-(Z-9-octadecenyl)-N-amine oxide and wherein said alginate is about 0.25 wt % of sodium alginate.

15. The thermal ink-jet ink of claim 1 wherein said at least one low vapor pressure solvent and said anti-cockle agent are the same.

16. The thermal ink-jet ink of claim 1 wherein said at least one low vapor pressure solvent and said anti-cockle agent are different.

17. The method of claim 8 wherein said at least one low vapor pressure solvent and said anti-cockle agent are the same.

18. The method of claim 8 wherein said at least one low vapor pressure solvent and said anti-cockle agent are different.

* * * * *